United States Patent [19]

Acello

[11] Patent Number: 4,691,249

[45] Date of Patent: Sep. 1, 1987

[54] DROPOUT COMPENSATOR AND LUMINANCE AVERAGER WITH "SHARED" DELAY

[75] Inventor: John J. Acello, E. Rochester, N.Y.

[73] Assignee: Eastman Kodak Company, Rochester, N.Y.

[21] Appl. No.: 747,733

[22] Filed: Jun. 24, 1985

[51] Int. Cl.[4] .............................................. H04N 5/76
[52] U.S. Cl. .................... 358/336; 360/38.1
[58] Field of Search ............... 358/314, 335, 310, 336, 358/906, 909; 360/38.1

[56] References Cited

U.S. PATENT DOCUMENTS

| | | | |
|---|---|---|---|
| 2,996,576 | 8/1961 | Dolby | 178/6.6 |
| 3,328,521 | 6/1967 | Moskovitz | 178/6.6 |
| 3,347,984 | 10/1967 | Holmberg | 178/6.6 |
| 3,463,874 | 8/1969 | Hodge et al. | 178/6.2 |
| 3,629,494 | 12/1971 | Hurst | 178/6.6 |
| 3,679,814 | 7/1972 | Barclay | 178/5.4 |
| 3,699,246 | 10/1972 | Hodge | 178/6.6 |
| 3,824,620 | 7/1974 | Langer | 360/38 |
| 3,949,416 | 4/1976 | Stalley et al. | 358/8 |
| 4,012,774 | 3/1977 | Kuniyoshi | 358/8 |
| 4,041,453 | 8/1977 | Umeda et al. | 360/38.1 X |
| 4,393,414 | 7/1983 | Reitmeier | 358/336 |
| 4,418,363 | 11/1983 | Kelleher | 360/38.1 X |
| 4,470,076 | 9/1984 | Aral et al. | 358/312 |
| 4,490,748 | 12/1984 | Kamoth | 358/314 |
| 4,492,988 | 1/1985 | Hashimoto | 358/336 |

*Primary Examiner*—Robert L. Richardson
*Attorney, Agent, or Firm*—David M. Woods

[57] ABSTRACT

A video disk player, arranged to reproduce a video signal from a single recorded field, operates with fewer components by "sharing" a one-line delay element with a dropout compensator and a luminance averager. In the absence of a dropout, the output video signal is taken from the one-line delay element. When a dropout is detected, the delayed video signal is recirculated to the input of the delay element. Since the video signals at both the input and the output of the delay element are free of dropouts, they are provided to the line averager for generating an interpolated signal for an interlaced (second) field.

5 Claims, 1 Drawing Figure

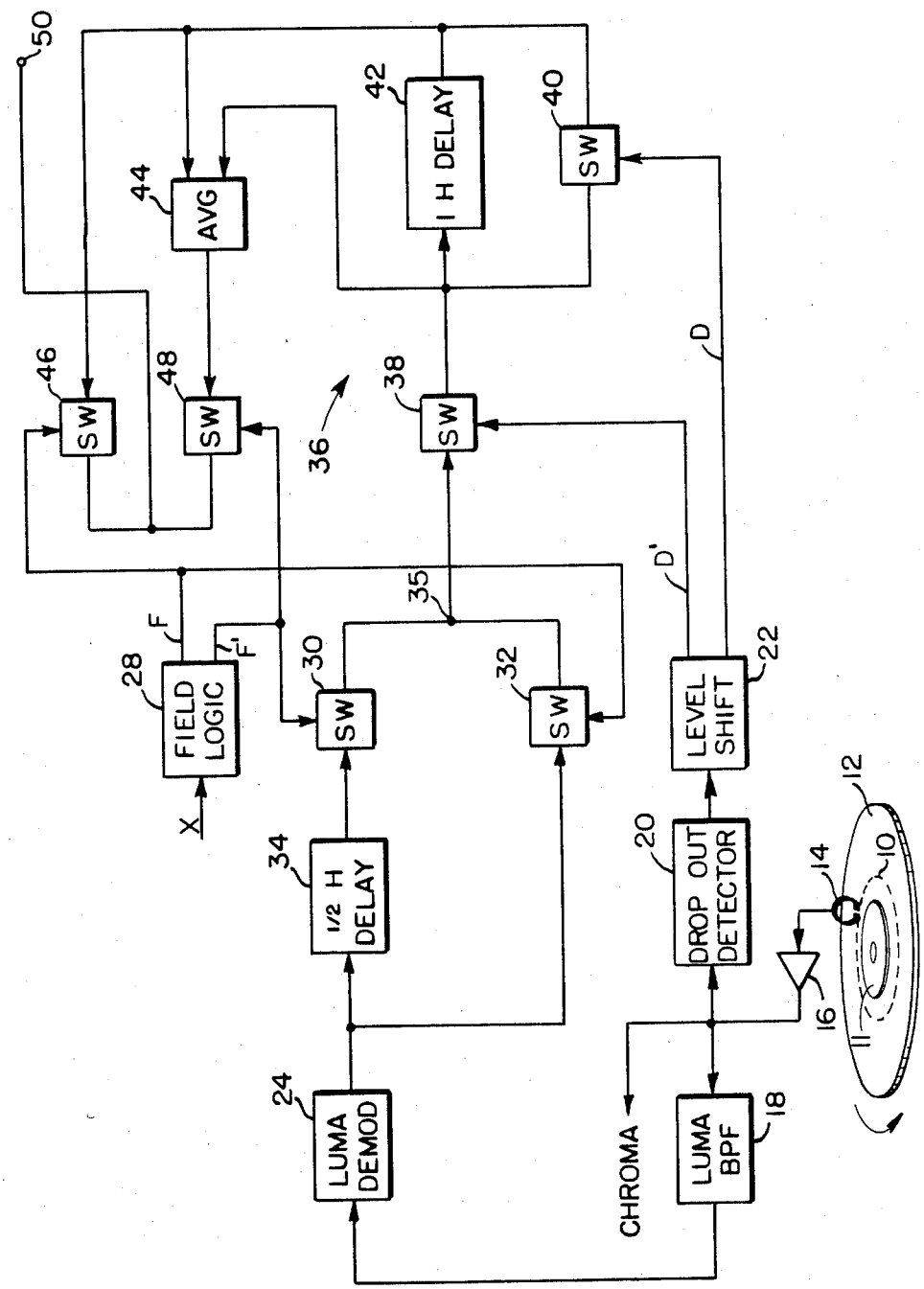

DROPOUT COMPENSATOR AND LUMINANCE AVERAGER WITH "SHARED" DELAY

BACKGROUND OF THE INVENTION

1. Field of the Invention

This invention pertains to video circuits that incorporate line delays, and in particular to circuits that average several video lines or compensate for dropouts in the reproduced signal.

2. Description Relative to the Prior Art

A new video recording format has been proposed in recent years in which a small, flexible magnetic disk is used to store up to 50 still video pictures. This format provides the option of storing a full frame (two circular tracks per picture) for 25 pictures, or a single field (one circular track per picture) for 50 pictures. Because of the resolution limitation of a typical video source (such as the solid state sensor in an electronic still camera) sufficient picture information for a full frame may be difficult to obtain. A single field, consequently, is often all that is available for recording on the disk for each picture.

The recorded disk is inserted into a video disk player, which converts the video signals recorded on the disk into an NTSC television signal. In order to provide a signal for a standard television receiver, it is desirable to form a second field with at least the luminance of the second field interpolated from successive lines of the recorded (first) field. For this reason, it is known to delay (during first-field-playback) the lines of the first field by a half-line (to obtain the second field) and then to average the amplitude of the picture element video signals on two successive lines (see, for example, U.S. Pat. No. 4,470,076). As shown by this patent disclosure, luminance averaging requires a one-line delay in order to simultaneously process two lines of signals.

A dropout compensator is useful in a video disk player for replacing information found to be missing after the video signal has been recorded and reproduced from a magnetic disk. A dropout, which is the designation given to the missing information, may be due to imperfections in the magnetic disk or to problems in the recording and/or reproduction process itself. When the dropout occurs, it causes a disturbance in the video signal and, usually, manifests itself in the form of a streak or flash on the screen of the television receiver. Dropout compensation depends on line-to-line redundancy in the picture information, thus making it possible to compensate for a dropout by substituting information from a spatially-corresponding part of a previous line. In doing this, a dropout compensator ordinarily stores information from a previous line and inserts the stored information when a dropout occurs.

Storing the video information for dropout compensation, just as averaging two lines of video information for a second field, requires the use of a one-line delay element (see, for example, U.S. Pat. No. 2,996,576). It is informative to realize that the aforementioned video player is likely to be a cost-sensitive consumer product. Delay elements, like other parts of the player, represent cost elements that need to be carefully trimmed. While anyone can see that, from this perspective, one delay element is to be preferred over two, the combination of the two heretofore disparate functions of dropout compensation and line averaging is not evident from the prior art. A dropout compensator ordinarily switches between two line signals: one signal is a freshly reproduced signal . . . which may include a dropout . . . and the other signal is a one-line delayed signal free of dropouts. Though a line averager also uses two line signals, one delayed by a line with respect to the other, it is highly desirable that both signals be free of dropouts.

SUMMARY OF THE INVENTION

The video circuit according to the invention "merges" both functions . . . dropout compensation and line interpolation . . . by arranging the dropout compensator so that, in the absence of a dropout, the output video signal is always delayed by one horizontal line. Then, when a dropout is detected, the delayed video signal is recirculated to the input of the device providing the delay for as long as the dropout persists. The signal with the dropout is thus replaced by the one-line delayed signal, which is thereafter delayed again by the delay device before being applied as an output to subsequent processing circuits. This means that the video signals at both terminals of the delay device are always free of dropouts. The line interpolator, consequently, can take its paired inputs directly from the terminals of the delay device used by the dropout compensator.

BRIEF DESCRIPTION OF THE DRAWINGS

The invention will be described with reference to the drawing, which shows a block diagram of a circuit for performing dropout compensation and line interpolation with a shared delay element.

DETAILED DESCRIPTION OF THE PREFERRED EMBODIMENT

Since video players are well known in which signals are reproduced from magnetic media such as tape or disk, the present description will be directed in particular to elements forming part of, or cooperating more directly with, the present invention. Elements not specifically shown or described herein may be selected from those known in the art. For example, a conventional video player includes provision for equalization, de-emphasis (insofar as a frequency-modulated signal is involved), signal clamping and buffering at strategic points, and the like. Such circuits are not shown as they are entirely conventional, as well as unnecessary for a full understanding of the invention. Likewise, the luminance signal is singled out for description since this signal is the most likely candidate for line interpolation (i.e., the eye is less sensitive to line-to-line chrominance repetition, thus making chrominance interpolation less advantageous). The invention may nonetheless be practiced in connection with the processing of a chrominance signal, should that prove desirable.

Referring now to the drawing, the preferred embodiment is useful with a recording and reproducing system in which a single field of video information is recorded as one track 10 of a small, flexible magnetic disk 12. The description will be with reference to one track but the disk 12 is designed to support many recorded tracks, for example, fifty tracks. The disk is mounted to a hub 11 and rotated according to the arrow by conventional ancillary apparatus (not shown) so that the track 10 cooperates with a stationary magnetic head 14. The recorded video signal is sensed by the magnetic head 14 and processed by a preamplifier 16. The recorded video signal is, according to the preferred embodiment, a composite color video signal that has been frequency-modulated on a suitable carrier. Accordingly, the preamplified signal is separated into its luminance component by a luminance band-pass filter 18; in addition, the preamplified signal is provided separately to a dropout detector 20. (The chrominance component is routed aside at this point for further processing.) The dropout detector 20 monitors the envelope of the carrier and forms a switching signal when a transient is detected indicative of a dropout. Since subsequent switching circuits require a relatively high level switching signal, say 12 volts, the switching signal from the detector 20 drives a level shifting circuit 22. Two output signals are provided by the circuit 22: a signal D' indicates the absence of a dropout and a signal D the presence of a dropout.

For the particular signal format used, the baseband luminance and chrominance signals, prior to recording, frequency-modulate distinct carriers. The modulated luminance carrier from the filter 18 consequently is demodulated by a luminance demodulator 24. Two fields, it is recalled, must be generated from one recorded field and properly interlaced if a frame is to be produced on the face of a television receiver. Because each field is treated separately, and differently, it is necessary to identify them. A field logic array 28 therefore monitors the condition of a field start signal X and accordingly switches the levels of a (first) field switching signal F and a (second) field switching signal F'. The signal F represents the recorded field and the signal F' represents the interlaced field interpolated from the recorded field. The field start signal X may be originated in several ways: It may be derived from part of the recorded signal. Alternatively, and as done in connection with the preferred embodiment, it may be generated by sensing a metallic element embedded in the hub 11 of the disk 10. In the latter case, each recorded field is put down relative to the metallic element so that a signal derived therefrom precedes the sensing of a field.

In order to properly present an interlaced standard-format signal, a half-line delay is inserted into the interlaced (second) field—there being 262.5 lines in each field and consequently an offset of one-half line in each second field. The two fields are set in proper sequence by branching the baseband luminance signal from the demodulator 24 into two video field switches 30 and 32. The luminance signal intended for the interlaced (second) field is first given a half-line delay by a delay element 34. The switches 30 and 32 are triggered at the field rate by the switching signals F and F' so that all the lines recorded on the track 10 of the disk 12 pass successively through one branch and, during the next disk revolution, pass successively through the other branch, and so on in alternating sequence. In that way a full-frame signal is available at circuit point 35.

The luminance signal at the circuit point 35 is provided to a dropout compensator 36 comprised of an input switch 38, a feedback switch 40 and a one-line delay element 42. The signals D and D' from the dropout detector 20 and the level shifting circuit 22 determine the state of the switches 38 and 40. In the absence of a dropout, and with the signals D' HIGH and D LOW, the luminance signal passes through the closed input switch 38 and into the one-line delay element 42. When a dropout is detected, the signal D' goes LOW while the signal D is driven HIGH. Then, for the duration of the dropout, the luminance signal at the output of the delay element 42 is fed back to its input through the closed switch 40. Meanwhile the dropped-out portion of the incoming luminance signal is blocked by the open input switch 38. The effect is to have a line section from a preceding line substituted for the dropped-out portion. Should the dropout persist for more than one line, the preceding line . . . which is free of dropouts . . . will continually recirculate through the one-line delay element 42. A dropout-free luminance signal constituting the recorded (first) field is taken for further processing from the output side of the one-line delay element 42.

The luminance signal at the input side of the one-line delay element 42 is, as a consequence of the circuit design, also free of dropouts. It so happens that each line of luminance for the interlaced (second) field is interpolated from adjacent lines of the recorded (first) field, subject to the condition that the adjacent lines are free of dropouts. A line averager 44 is therefore connected across the one-line delay element 42, that is, between its input and output terminals, for averaging adjacent lines of the recorded (first) field. (Averaging represents a favored form of interpolation; other types of interpolation are not excluded.) The output of the averager 44 is a line-by-line interpolation of adjacent lines of the recorded field and constitutes the interlaced (second) field.

The luminance signal for the recorded (first) field is provided directly from the output of the one-line delay element 42 to a first output switch 46; the luminance signal for the interlaced and interpolated (second) field is provided to a second output switch 48. The levels of the signals F and F' from the field logic array 28 determine the condition of the output switches 46 and 48: the switch 46 is closed and passes the luminance signal for the recorded (first) field to an output terminal 50 when the signal F is driven HIGH. Conversely, the switch 48 is closed and passes the averaged luminance signal for the interlaced (second) field to the output terminal 50 when the signal F' is driven HIGH. The output luminance signal at the terminal 50, free of dropouts and interpolated as to interlaced lines, is available for further processing, including eventual recombination with the chrominance signal and display.

The components described in connection with the invention are conventional and may be selected from any number of well-known devices that perform the described functions. For example, the switches 30, 32, 38, 40, 46 and 48 should switch quickly, so high speed DMOS switches were selected. (In particular, DMOS switches SD 5401 and SD 5001 were used, though others could be substituted.)

Because the invention allows for the use of a one-line delay for "both" a first playback (lace) field as well as a second (interlace) field interpolated from the first field, only a single one-line "two-purpose" delay is required in connection with the practice of the invention. This contrasts with the prior art practice that requires two discrete delays for, respectively, line averaging and drop-out purposes.

The invention has been described in detail with particular reference to a presently preferred embodiment, but it will be understood that variations and modifications can be effected within the spirit and scope of the invention.

What is claimed is:

1. A video circuit that compensates for signal dropouts in a video signal representative of a video field and generates an interpolated video signal from adjacent lines of the video field, said circuit comprising:

a one-line delay element having input and output terminals;

an input switch through which the video signal is provided to the input terminal of said delay element;

means for opening said input switch and recirculating the delayed video field signal to said input terminal of said delay element when a signal dropout occurs;

means for generating an interpolated line signal from the video field signals at said input and output terminals of said delay element; and means for generating a video frame signal from the delayed video field signal at the output of said delay element and the interpolated signal from said interpolating means.

2. The video circuit as claimed in claim 1 in which said means for generating an interpolated line signal comprises a line averager for averaging the value of the video field signals at said input and output terminals of said delay element.

3. A video circuit providing dropout compensation for a video signal derived from a single-field video recording and for generating an interpolated second field from the recorded field, said circuit comprising:

an input terminal for receiving the video signal;

a delay element for delaying the input signal by one horizontal line;

circuit means including an input switch for connecting said input terminal to the input of said delay element;

circuit means including a feedback switch for recirculating the delayed video signal from the output of said delay element to its input;

means for actuating said input and feedback switches according to the presence of a signal dropout such that the dropout-free delayed signal is substituted for the portion of the incoming video signal having the dropout;

an interpolator for estimating an intermediate, interpolated signal from two input signals;

circuit means for connecting the input and output of said delay element to respective inputs of said interpolator;

an output terminal;

circuit means including a first output switch for connecting the output of said delay element to said output terminal;

circuit means including a second output switch for connecting the output of said interpolator to said output terminal; and means for actuating said first and second output switches at the field rate such that a sequence of recorded and interpolated fields are provided to said output terminal.

4. The video circuit as claimed in claim 3 in which said interpolator comprises a circuit for averaging its two input signals.

5. The video circuit as claimed in claim 3 further comprising:

means preceding said input terminal for directing the incoming video signal along two signal paths, including one path in which the video signal is delayed by one-half line, and means coupled to said means for actuating said first and second output switches for alternately switching the video signals passing through said two signal paths to said input terminal.

* * * * *